(No Model.)

W. E. CLIFFORD.
CLUTCH.

No. 411,237. Patented Sept. 17, 1889.

Witnesses.
Howard F. Eaton.
Frederick L. Emery.

Inventor:
Walter E. Clifford,
by Crosby & Gregory, Attys

UNITED STATES PATENT OFFICE.

WALTER E. CLIFFORD, OF FITCHBURG, MASSACHUSETTS.

CLUTCH.

SPECIFICATION forming part of Letters Patent No. 411,237, dated September 17, 1889.

Application filed July 1, 1889. Serial No. 316,223. (No model.)

*To all whom it may concern:*

Be it known that I, WALTER E. CLIFFORD, of Fitchburg, county of Worcester, State of Massachusetts, have invented an Improvement in Clutch Devices, of which the following description, in connection with the accompanying drawings, is a specification, like letters on the drawings representing like parts.

This invention has for its object the production of a novel clutch mechanism, whereby a disk or wheel may be actuated positively for but a partial rotation, as when a rotating shaft carrying it starts to complete one or several rotations, the said disk or wheel being arrested and freed from the said shaft before the latter completes a rotation, and thereafter remaining at rest so long as the rotation of the shaft is continued in the same direction.

The clutch herein referred to is so combined with its actuating-shaft that the disk or wheel actuated positively partakes of a partial rotation, as described, only during the first part of each initial rotation of the actuating-shaft in either direction.

My invention is especially adapted, among other things, to control the direction and extent of rotation of feed-screws in metal-planers, and it may be introduced in the train of mechanism between the usual main driving-shaft of such metal-planer and the feed-screws for changing the position of the tool or tools being used, the said driving-shaft, it being understood, being rotated first in one and then in an opposite direction to suitably reciprocate the work-table.

Figure 1:
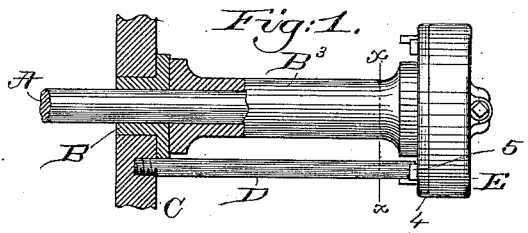
Figure 2:
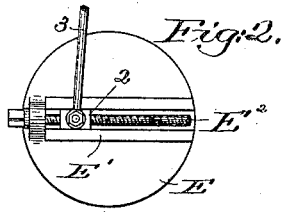
Figure 3:
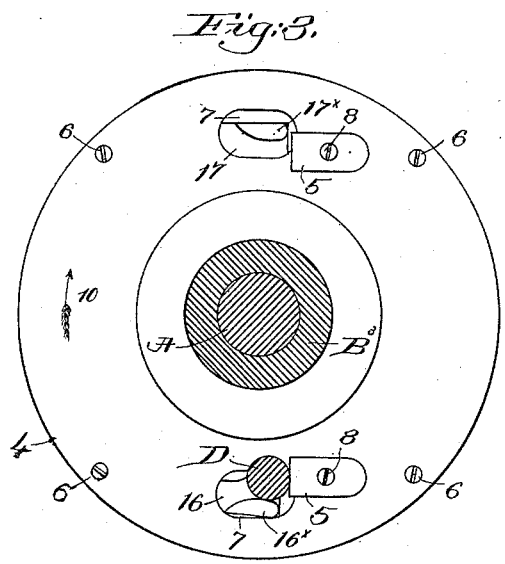
Figure 4:
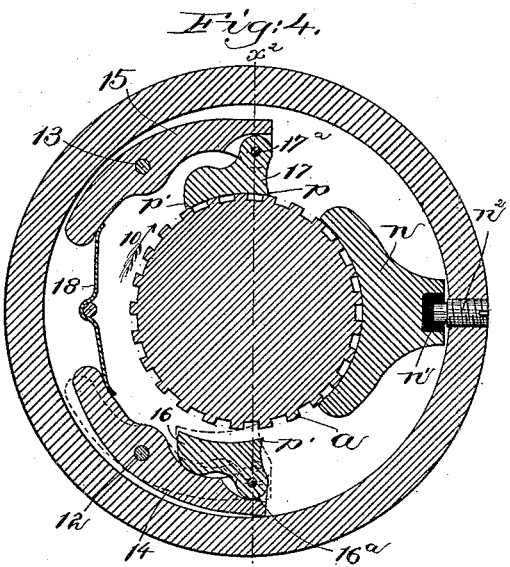
Figure 5:
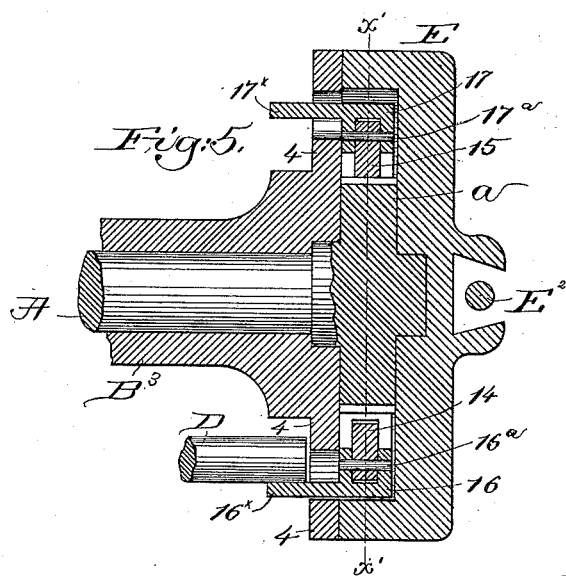

Figure 1, in side elevation, partially broken out, represents a clutch embodying my invention; Fig. 2, a right hand end elevation of Fig. 1. Fig. 3 is a section to the right of the dotted line $x$, Fig. 1, but on an enlarged scale. Fig. 4 is a section of the clutch shown in Fig. 3, at right angles to the main shaft, the line of section being shown at $x'$ in Fig. 5, the view being from the left of the said line $x'$. Fig. 5 is a longitudinal section in the line $x^2$, Fig. 4.

The shaft A represents, it may be supposed, the main shaft of a metal-planer or other machine having a work-table, the direction of motion of which is to be reversed at stated intervals to carry the work under the usual tool.

B represents a bearing for the shaft, C a part of the frame-work, and D a projection extended from the said frame to constitute a pawl-releasing device and also a stop.

The disk E, having the guideway E' and the nut 2 therein, and the screw $E^2$ are and may be all as common to metal-planers, they constituting a crank, and as to the rod 3, connected to the said nut, it may be considered that it is to be extended upward to and to actuate the pawl commonly employed to rotate intermittingly through usual devices one or more feed-screws employed to move the tool of the planer, so that it will be kept up to its work, all as usual.

The invention in clutches herein contained is devised especially to positively connect a shaft with a disk or crank, so that whenever the direction of rotation of the shaft is reversed or changed the said disk or crank will be instantly clutched to the said shaft, causing the latter to give to the disk or crank substantially a semi-rotation in unison with the said shaft when the said disk or crank is stopped.

In the use of my invention with a metal-planer the rotation of the disk or crank is just far enough to actuate through one stroke the usual pawl and ratchet. (Not shown, but commonly employed to give motion to the feed-screw for changing the position of the tool being used.)

Prior to this invention it has been customary to employ pieces of leather or equivalent material between the disk and a collar on the shaft A, and so also a friction-clutch has been employed for a like purpose.

Instead of the frictional connection described, I provide the shaft A with a toothed gear $a$, which is rotated first in one and then in an opposite direction for one or more rotations.

The flange 4 of the sleeve $B^3$ is suitably attached to the disk or crank E by screws, as 6, (see Fig. 3,) or in other manner. The flange 4 is slotted, as at 7, and has attached to it in suitable manner, as by screws 8, lugs or ears 5. The flange 4 has pins or studs 12 13, on which are pivoted levers 14 15, each carrying a clutch-pawl, as 16 17, and having, respectively, lips $16^\times$ $17^\times$, which are extended out through the slots 7 of the flange 4 in the range of the projection D. The levers 14 15, the clutch-pawls, and the wheel or gear $a$ form a clutch mechanism. The levers are acted upon by a spring 18, which normally turns the levers in the direction to keep the concaved faces of the clutch-pawls against the periphery of the gear $a$, as shown by the clutch-pawl 17 in Fig. 4. The pivots $16^a$ $17^a$ of the clutch-pawls 16 17 are so placed that the points $p$ of the pawls will not engage the teeth of the wheel $a$ so long as the direction of rotation of the said wheel is from the heel $p'$ toward the point of the pawl, as represented by the pawl 17 at the upper side of Fig. 4; but when the direction of rotation of the wheel $a$ is from the point toward the heel of a pawl then the pawl is instantly tipped on its pivot, and the point $p$ positively engages a tooth of the wheel $a$, and the disk or crank E immediately starts to rotate with the shaft A, and this rotation of the disk or crank will continue with the shaft until the clutch-pawl, which is the driver, is disengaged by its lip $16^\times$ or $17^\times$ meeting the projection D, it then constituting a pawl-releaser.

In Figs. 3 and 4 it will be supposed that when the shaft A was started to rotate in the direction of the arrow 10 the clutch-pawl 16 occupied the position shown by the pawl 17, and that the point $p$ of the pawl 16 immediately engaged the wheel $a$, causing the disk or crank E to move with the said shaft; but as soon as the lip $16^\times$ of the pawl 16 struck the pawl-releaser D the latter, by moving outwardly the end of the lever 14, effected the disengagement of the said pawl from the said wheel $a$, and the lug 5, next to the said pawl and connected to the disk or crank, struck the projection D and arrested the rotation of the disk or crank, while the shaft continued to rotate.

In the condition of the parts in Figs. 3 to 5, should the direction of rotation of the shaft A be reversed, the point $p$ of the pawl 17 will immediately engage the wheel $a$, and the disk or crank will start to rotate in the same direction as the said shaft, and immediately thereafter the lip $16^\times$ of the pawl 16 will be carried out from under the projection D, permitting the pawl 16 to settle against the wheel $a$; but as soon as the lip $17^\times$ of the pawl 17 meets the projection D, which happens during a partial rotation of the shaft, the said pawl will be released, as described of the pawl 16, and the disk or crank will again be stopped; but the pawl 16, in contact with the wheel $a$, will not have its point engaged with the wheel $a$ until the direction of movement of the shaft A is again reversed.

The brake $n$ (shown in Fig. 4 as acting against the toothed wheel or gear $a$) serves to hold the same lightly by friction, thus overcoming any backlash or slipping which may occur by reason of looseness or wear of parts. This brake, as herein represented, contains a spring, as $n'$, which may be of rubber or other usual material, which is acted upon by a set-screw $n^2$, the latter serving to regulate the contact between the brake and the said wheel $a$.

I claim—

1. The combination, with a shaft adapted to be rotated in one and then in an opposite direction and a disk or crank loose thereon, of a clutch composed of a toothed wheel and pawls to engage the teeth of the wheel to positively connect the said disk or crank and the said shaft for but a portion of its first rotation in either direction, and then to automatically disengage the said clutch and leave the said disk or crank disconnected from the said shaft until the direction of rotation of the said shaft is changed, to operate substantially as described.

2. The combination, with a shaft adapted to be rotated in one and then in an opposite direction and a disk or crank loose thereon, of a clutch composed of a toothed wheel or gear fast on the said shaft and levers and clutch-pawls, and with means to release from the said wheel after but a partial rotation of the said shaft that one of the said pawls which acts as its driver, whereby the said shaft at the commencement of its rotation in either direction is enabled to positively start the disk or crank and move the same with it for but part of a rotation of the said shaft, at which time the pawl is released and the disk or crank remains at rest, while the shaft continues to rotate, substantially as described.

In testimony whereof I have signed my name to this specification in the presence of two subscribing witnesses.

WALTER E. CLIFFORD.

Witnesses:
FREDERICH FOSDICK,
WALTER A. AUSTIN.